Jan. 6, 1959   D. R. BAKER ET AL   2,867,016
TIMBER CONNECTOR
Filed May 9, 1955
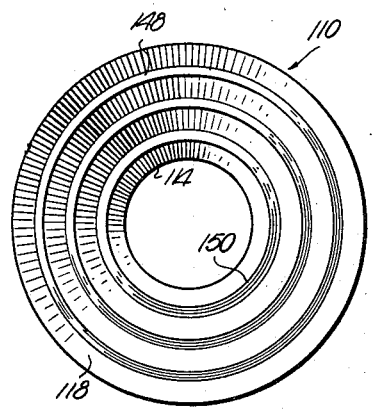
Fig. 3.
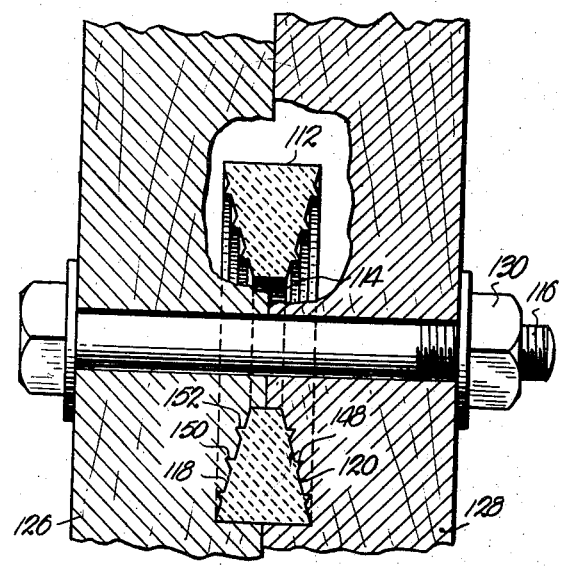
Fig. 4.
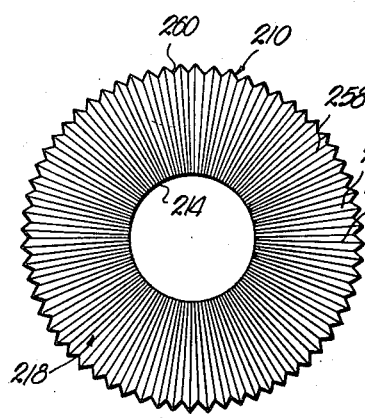
Fig. 5.
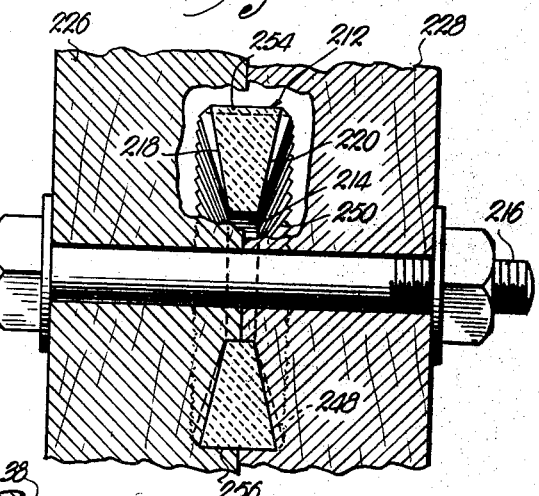
Fig. 6.
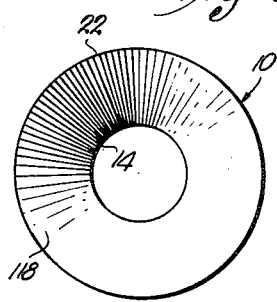
Fig. 1.
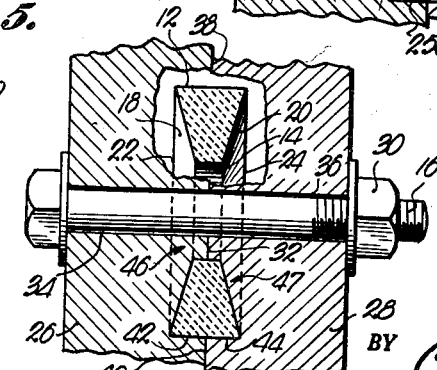
Fig. 2.
Donald R. Baker
John A. Nelson
Alton B. Storer
INVENTORS
BY 
ATTORNEY.

United States Patent Office 2,867,016
Patented Jan. 6, 1959

2,867,016

TIMBER CONNECTOR

Donald R. Baker, Blue Springs, Mo., and John A. Nelson, Overland Park, and Alton B. Storer, Mission, Kans., assignors to The Marley Company, Kansas City, Mo., a corporation of Delaware Application May 9, 1955, Serial No. 507,103

5 Claims. (Cl. 20—92)

This invention relates to improvements in connectors for increasing the load-carrying capacity of timber joints by being partially embedded in each of a pair of wood members to transmit the load from one of such structural members to the other, the primary object being to provide a connector that is predicated on the wedge principle to more effectively improve the timber joint, not only by virtue of thereby providing increased bearing surfaces, but because the shear strength of the central core is strengthened as it is placed into compression in perpendicular relationship to the shear plane whenever the timbers tend to shift relatively in substantially parallel planes.

Numerous ring or dowel connectors have been developed and used in the past. The objective of all such devices is to increase the bearing surface, with a resulting reduction in unit stress when transmitting load through the connector from one timber to the other. The dowel connector transmits the entire load as a compressive force on the bearing surfaces, whereas ring connectors utilize a central core to further increase the load-carrying capacity. Part of the load is thus transmitted from one timber through the connector and into the core which is thereby placed in shear. Both types of connectors require a recession in the wood members to receive the connector, but maximum strength is developed only with a tight or snug fit of the connector in the recession. Such tolerance applies to both depth of cut and circumference of the recession; however, close tolerances are difficult to obtain in wood because it is not stable dimensionally under varying moisture conditions. Too snug a fit presents assembly difficulties and a loose fit allows movement in the joint before the connector seats and becomes effective.

The most important object of the present invention therefore, is to provide a connector that will utilize the maximum strength of the central core and also to develop greater strength when assembled with other than a perfect fit which is not attainable in practical use through provision of a configuration that is relatively thin at the center and appreciably thicker at its peripheral edge.

A further object of the present invention is to provide a central core of maximum diameter, thus increasing the area that is placed in shear.

Another important object of this invention is to provide a cone-shaped central core which materially increases the bearing surface between the core and connector, thus decreasing the load per unit of area.

Another object of the instant invention is to provide a connector having the aforementioned characteristics, together with ribs or other protrusions that will facilitate the assembly of a tightly fitting connector, and while such an assembly will not develop full strength until some relative movement of the joint occurs, it will develop some immediate strength which is not attainable in connectors heretofore known.

A still further object of the present invention is to provide a ribbed connector so that the cutting action of the ribs makes it possible and practical to assemble a joint having a nearly perfect fit.

Another important object of the instant invention is to provide a connector which does not require the strength of metals that are costly and corrodible but may be made of cheaper and more inert materials such as glass, ceramics, or plastics.

An additional object of this invention is to provide a connector that will properly transmit the loads as the same tends to tip within its recessions, thereby preventing such tipping and consequent failure of the reinforced joint.

In the drawing:

Figure 1 is a side elevational view of one form of timber connector made pursuant to our present invention.

Fig. 2 is a cross-sectional view of the connector shown in Fig. 1 illustrating the same in operative use to reinforce a structural joint.

Fig. 3 is a side elevational view of a modified form of connector.

Fig. 4 is a cross-sectional view similar to Fig. 2 showing the connector of Fig. 3.

Fig. 5 is a side elevational view of still another form of connector; and

Fig. 6 is a cross-sectional view of the connector shown in Fig. 5.

As above indicated, the three connectors shown in the drawing each have novel shapes and configurations to improve the effectiveness thereof in reinforcing a timber joint and, by virtue of such configurations, it is possible to make the same from metal or any other suitable material such as ceramic or other noncorrosive substance.

The connector shown in Figs. 1 and 2 of the drawing consists of a ring 10, provided with a peripheral edge 12 which may, if desired, be circular, transversely flat and parallel transversely thereof with the axis of the ring 10, as shown.

An opening 14 for clearing a tie bolt 16 is, as illustrated, appreciably greater in diameter than that of the bolt 16 and concentric with the peripheral edge 12. Sides 18 and 20 of the ring 10 may be concave, convex or otherwise shaped, but as shown, they are each radially flat, and the thickness of the ring 10 progressively decreases uniformly as the opening 14 thereof is approached. In other words, as seen in Fig. 2, the thickness of the ring 10 at the opening 14, is appreciably less than the thickness thereof at the peripheral edge 12. Furthermore, as above indicated, it is to be preferred that the sides 18 and 20 be identical so far as the degree of bevel thereof is concerned, whereby the opening 14 is disposed not only centrally with respect to the peripheral edge 12, but midway between the outermost edges 22 and 24 where the sides 18 and 20 respectively merge with the peripheral edge 12. As will hereinafter be made clear, in bevelling the ring 10 to form sides 18 and 20, it is preferred that the angle of repose or angle of friction be exceeded, but not to such extent as to diminish the advantages of having a pair of relatively large cores 46 and 47 as will hereinafter appear.

It is seen therefore, that when the structural wood members 26 and 28 are clamped together with the ring 10 therebetween by tightening of nut 30 on bolt 16, the ring 10 will be encased within the complemental recessions that are pre-formed in the members 26 and 28 and the latter will bear together in face-to-face relationship, not only within the opening 14 as at 32 adjacent bolt-receiving holes 34 and 36 in members 26 and 28 respectively, but as at 38 and 40 outwardly from the peripheral edge 12 of ring 10.

The radially beveled faces of sides 18 and 20 present a wedge-shaped, cross-sectional configuration as shown in Fig. 2, presenting an extremely strong joint so that loads are properly transmitted and the members 26 and 28 prevented against relative movement within a plane substantially parallel with their proximal faces. The timbers 26 and 28 are particularly held against relative sliding movement transversely of the axis of bolt 16 because of the wide, flat edge 12 and the deep, inwardly facing, annular shoulders 42 and 44 in the members 26 and 28 respectively. This fact, coupled with the presentation of frusto-conical cores 46 and 47 formed by the timbers 26 and 28, reinforces the joint in a manner not made possible by conventional connectors of this type. Whether or not cores 46—47 extend into opening 14 is of little consequence however.

At this juncture, it is to be pointed out that, whether or not the opening 14 is appreciably larger than the bolt 16 is of little importance except for the fact that when ceramics or similar materials are utilized rather than metal, the connector 10 will less likely be damaged by the bolt 16 when a larger opening 14 is used.

Similarly, the sides 18—20 might well converge to a feather edge surrounding the bolt 16 if desired as long as there is not too great a variance from the angle of repose as aforementioned.

It is now clear that at least two primary results are attained by such construction. First, by carefully selecting the proper bevel for the sides 18 and 20, there is in fact presented a wedging action which will effectively strengthen the joint. And, secondly, the cores 46 and 47 have maximum diameters equal to the diameter of the connector 10 at edges 22—24, thereby increasing the bearing surface.

Thus, viewing Fig. 2, if for example the timber 26 should tend to shift downwardly with respect to timber 28, the forces will be transmitted from shoulder 42 of timber 26 to edge 12, through the connector 10 diagonally thereof and thence to the shoulder 44 of timber 28. This, of course, tends to tip the connector 10 within the two recessions in the usual manner but, by virtue of the fact that such transmission of forces places the cores 46 and 47 into compression, the shear strength of the cores 46 and 47 is increased.

It is to be noted that during such downward movement of the timber 26 relative to timber 28, and as connector 10 tends to tip from right to left, viewing Fig. 2, the lowermost part of face 18 does not move away from core 46. Instead, core 46 tends to follow the lower part of face 18 and remain in contact therewith. By the same token, the core 47 shifts upwardly and remains in contact with the upper portion of face 20. And, of course, bolt 16 opposes the tendency for faces 40 to separate as the timbers shift, providing a tight clamping action at the joint.

Manifestly, the conical configuration of the cores 46 and 47 and the recesses in which they are fitted, causes the compression upon the cores, and therefore, the shear strength, to progressively increase as the forces acting on the timbers increase. This increased shear strength in the cores 46 and 47, together with the fact that they are fitted complementally in the conical cavities therefor, causes the wedging principle of the instant invention to obviate the adverse effects of the tipping action. In fact, the strength of the joint then becomes dependent upon the ability of the connector 10 itself to withstand the forces. In the case of some materials the shear strength of cores 46 and 47 becomes so great that the connector 10 is quite likely to shatter before the cores 46 and 47 will yield to the adverse forces. If the connector 10 is made from metal or other strong material, the joint becomes as strong as the cores 46 and 47, and shoulders 42—44, and as above set forth, tremendous pressures tending to shift the timbers relatively would have to be exerted before the joint would fail.

The objectiveness of the connector 10, when used with the timbers 26 and 28 as above described, may be supplemented in the manner shown by Figs. 3 and 4 of the drawing by providing a rim 110 having additional advantageous characteristics. The shape, configuration and manner of clamping the ring 110 in place between timbers 126 and 128 through take-up means such as bolt 116 and nut 130, is the same as above set forth when the connector 110 is utilized and, therefore, need not be repeated. Connector 110 is, however, provided with a plurality of ribs 148 on its inclined sides 118 and 120 which may, if desired, be caused to bite into the timbers 126 and 128 when the connector 110 is clamped into place and grooves formed therefor by the clamping action.

The ribs 148 may be identical, concentric with edge 112 and bolt clearance opening 114, triangular-shaped in transverse cross-section presenting outwardly facing, relatively sharp cutting edges 150 that facilitate the embedding of the ring 110 within the timbers 126 and 128 when the nut 130 is taken upon the bolt 116. In some instances however, it may be desirable to mill the grooves within the recesses of the timbers.

It is to be advantageous further that each of the ribs 148 be provided with inwardly-facing surfaces or shoulders 152 concentric with the flat, peripheral edge 112 and the inner edge of the ring 110 presented by formation of central opening 114. It can be seen, therefore, that the ribs 148 effectively cooperate with the edges 112 and 114 in preventing relative movement of the timbers 126 and 128 in a direction transversely of the longitudinal axis of bolt 116.

In many applications it is more desirable or necessary to reinforce the joint through ring connectors having other types of projections, nodules, shoulders or the like to prevent relative movement of timbers 226 and 228 (Fig. 6). Accordingly, ring connector 210, shown in Figs. 5 and 6, is provided with a series of radial ribs 248 on each of its two relatively converging sides 218 and 220 respectively, together with a circumferential series of transverse ribs 254 throughout peripheral edge 212 thereof.

Ribs 248 and 254 are all advantageously triangular-shaped in transverse cross-section to present relatively sharp biting edges 250 and 256 respectively, the edges 256 being parallel with the axis of the ring 210. The large number of relatively narrow, radial ribs 248 present similarly-shaped grooves 258 in the sides 218 and 220 of ring 210, and it is seen that the depths of the grooves 258 progressively decrease to zero as central opening 214 is approached. The ribs 248 will accordingly progressively increase in height or altitude as the peripheral edge 212 is approached. V-shaped, transverse grooves 260 between the ribs 254 may be of uniform depth from side 218 to side 220 and it is to be noted that each groove 260 spans the distance between a pair of opposed ribs 248. Groves as at 260 may also be provided in the preipheral edges 12 and 112 of connectors 10 and 110 respectively. They facilitate the insertion of the connector into the recessions and assure a better fit so that the effectiveness in holding the timbers against relative movement takes place immediately. Similarly, the ribs shaped as at 148, 248 or otherwise, take up the looseness that is needed to make insertion easier and therefore, act at once to reinforce the joint as distinguished from a loose fit where some movement of the timbers can always take place before the connector operates as intended.

The effectiveness of the ribs in helping to prevent relative movement of the timbers is, therefore, quite apparent and such ribs function for the intended purpose in an improved manner because of the wedge-shaped, cross-sectional configurations and other important features of the rings as initially explained when describing the ring 10. It is, therefore, seen that there has been presented a reinforcing device having many advantages not inherently included in conventional devices of this character.

Having thus described the invention what is claimed as new and desired to be secured by Letters Patent is:

1. A connector for increasing the load-carrying and shear strength characteristics of a tie bolt joint interconnection between the overlapped ends of a pair of elongated timbers comprising an annular, unitary member adapted to be embedded equally within identical, preformed, substantialy complemental recesses in opposed faces of the timbers and in surrounding relationship to the tie bolt, said member having radially spaced, substantially cylindrical, parallel, inner and outer peripheral surfaces and opposed annular sides joining said surfaces, said peripheral surfaces each being spaced from and concentric with the tie bolt when the connector is in said recesses, said outer peripheral surface being substantially wider than the inner peripheral surface and the latter being disposed substantialy midway between the circular edges of said outer peripheral surface and the distance between said peripheral surfaces being greater than the distance between the outer cylindrical face of the bolt and said inner preipheral surface of the connector when the latter is disposed in said recesses, the sides of said member being substantially frusto-conical in configuration and progressively and uniformly converging from said outer peripheral surface to the inner peripheral surface of the connector whereby the diameter of said outer peripheral surface defines the outer diameters of the timber cores presented by said opposed annular recesses.

2. A connector as set forth in claim 1 wherein said inner and outer peripheral surfaces and said opposed sides are substantially flat.

3. A connector as set forth in claim 2 wherein said sides are each provided with a plurality of circumferentially spaced ribs projecting outwardly from a respective side, concentric with said inner and outer peripheral surfaces, each of said ribs having a transversely flat surface parallel with the axis of said member and facing away from said axis.

4. A connector as set forth in claim 1 wherein said sides are each provided with a series of radially extending, outwardly projecting, triangular shaped ribs progressively increasing in height as said outer peripheral surface of the connector is approached.

5. A connector as set forth in claim 4 wherein said outer peripheral surface is provided with a series of triangular shaped, outwardly projecting, transverse ribs in alignment with respective radial ribs on said sides.

References Cited in the file of this patent

UNITED STATES PATENTS

| 1,881,931 | Powell | Oct. 11, 1932 |

FOREIGN PATENTS

| 338,127 | Germany | June 13, 1921 |
| 94,165 | Switzerland | Apr. 17, 1922 |
| 368,118 | Germany | Jan. 31, 1923 |
| 100,476 | Austria | Feb. 15, 1925 |
| 595,945 | Great Britain | Oct. 29, 1947 |
| 762,754 | Germany | Sept. 7, 1953 |